(12) United States Patent
Thomas

(10) Patent No.: US 9,064,143 B2
(45) Date of Patent: Jun. 23, 2015

(54) SYSTEM AND METHOD FOR DETERMINING MOTION OF A BIOLOGICAL OBJECT

(75) Inventor: Nicholas Thomas, Cardiff (GB)

(73) Assignee: GE HEALTHCARE UK LIMITED, Little Chalfont (GB)

(*) Notice: Subject to any disclaimer, the term of this patent is extended or adjusted under 35 U.S.C. 154(b) by 95 days.

(21) Appl. No.: 13/640,128

(22) PCT Filed: Apr. 5, 2011

(86) PCT No.: PCT/EP2011/055270
§ 371 (c)(1),
(2), (4) Date: Oct. 9, 2012

(87) PCT Pub. No.: WO2011/128228
PCT Pub. Date: Oct. 20, 2011

(65) Prior Publication Data
US 2013/0034272 A1    Feb. 7, 2013

(30) Foreign Application Priority Data
Apr. 12, 2010  (GB) .................................. 1006046.5

(51) Int. Cl.
G06K 9/00  (2006.01)
G06T 7/00  (2006.01)
G06T 7/20  (2006.01)
G06T 7/40  (2006.01)

(52) U.S. Cl.
CPC .......... *G06K 9/00127* (2013.01); *G06T 7/0016* (2013.01); *G06T 7/2053* (2013.01); *G06T 7/402* (2013.01); *G06T 2207/10016* (2013.01); *G06T 2207/20056* (2013.01); *G06T 2207/30024* (2013.01)

(58) Field of Classification Search
None
See application file for complete search history.

(56) References Cited

U.S. PATENT DOCUMENTS

| 4,437,161 | A | * | 3/1984 | Anderson | 600/425 |
| 4,542,459 | A | * | 9/1985 | Riederer | 600/431 |
| 4,723,261 | A | * | 2/1988 | Janssen et al. | 378/98.5 |
| 5,329,925 | A | * | 7/1994 | NessAiver | 600/413 |
| 5,934,278 | A |   | 8/1999 | Ishihara et al. | |
| 7,269,246 | B2 | * | 9/2007 | Ohishi | 378/98.12 |
| 7,460,689 | B1 |   | 12/2008 | Chan | |

(Continued)

FOREIGN PATENT DOCUMENTS

| JP | 2007-308311 A | 11/1995 |
| JP | 2009-512037 A | 3/2009 |

(Continued)

OTHER PUBLICATIONS

Notice of Preliminary Rejection for JP 2013-504198, mail date Jan. 6, 2015, 2 pages.

(Continued)

*Primary Examiner* — Shervin Nakhjavan
(74) *Attorney, Agent, or Firm* — Sutherland Asbill & Brennan LLP

(57) ABSTRACT

The invention provides a system and method of analyzing the motion of a biological object, particularly the motion of cultured organisms or cell cultures. The system and method of the invention may be used to determine the effect of a physical stimulus or a test agent on the motion of cell cultures. The system and method is of particular use in assessing the effect a chemical may have on the contractile motion of cardiomyocyte cell cultures.

8 Claims, 12 Drawing Sheets

(56) References Cited

U.S. PATENT DOCUMENTS

| | | | |
|---|---|---|---|
| 7,702,138 B2 * | 4/2010 | Lienard et al. | 382/128 |
| 8,090,171 B2 * | 1/2012 | Kramp et al. | 382/128 |
| 8,264,461 B2 * | 9/2012 | Brosnan et al. | 345/166 |
| 8,265,357 B2 | 9/2012 | Ramsing et al. | |
| 2006/0182349 A1 * | 8/2006 | Valadez | 382/221 |
| 2007/0195932 A1 * | 8/2007 | Nakaura et al. | 378/98.12 |
| 2008/0037844 A1 * | 2/2008 | Baumgart | 382/130 |
| 2008/0112606 A1 | 5/2008 | Lee et al. | |
| 2008/0247628 A1 * | 10/2008 | Ramsing et al. | 382/133 |
| 2008/0304732 A1 * | 12/2008 | Rittscher et al. | 382/133 |
| 2009/0067568 A1 * | 3/2009 | Hall et al. | 378/4 |
| 2010/0041090 A1 * | 2/2010 | Ramsing et al. | 435/29 |
| 2011/0299749 A1 * | 12/2011 | Rauch | 382/130 |

FOREIGN PATENT DOCUMENTS

| | | |
|---|---|---|
| WO | 02/069620 | 9/2002 |
| WO | 2007/042044 | 4/2007 |
| WO | 2007042044 A1 | 4/2007 |
| WO | 2004/021282 | 11/2013 |

OTHER PUBLICATIONS

GB1006046.5 Search Report Dated Jul. 13, 2010.
GB1105742.9 Examination Report Jul. 2, 2013.
Reif, R., et al., Analytical and Bioanalytical Chemistry (2009) 395:2411-2413.

* cited by examiner

SYSTEM AND METHOD FOR DETERMINING MOTION OF A BIOLOGICAL OBJECT

CROSS-REFERENCE TO RELATED APPLICATIONS

This application is a filing under 35 U.S.C. 371 of international application number PCT/EP2011/055270, filed Apr. 5, 2011, published on Oct. 20, 2011 as WO 2011/128228, which claims priority to application number 1006046.5 filed in Great Britain on Apr. 12, 2010.

TECHNICAL FIELD

The present invention relates to the determination of motion of a biological object, particularly to the determination of the motion in cultured organisms or cell cultures. The invention may be used to determine the effects of test compounds or environmental stimuli on the motion of biological objects, such as the contractile motion of cultures of cardiomyocytes.

BACKGROUND

The movement of cells during migration, motility, chemotaxis or wound healing, or the movement of small organisms such as zebrafish or nematodes is an important parameter in the study of biological systems. For example, many studies are directed at measuring the response of cells or cell cultures to a physical stimulus or a chemical treatment. Toxicological studies, in particular, often focus on the response of cell cultures to chemical treatment to determine if a chemical has an adverse effect on the growth and development of the test or cultured organism.

Cardiotoxicity currently accounts for 30% of drug failures during pre-clinical and clinical development and there is a strong demand from the pharmaceutical industry for more predictive cellular models to reduce attrition costs. Cardiomyocytes derived from human embryonic stem cells provide an advance towards development of more clinically predictive assays for assessing cardiotoxicity liabilities in new drug candidates. Cardiomyocytes may be used in a wide range of applications including electrophysiology, ion flux imaging and high content analysis to assess cardiac liability of candidate drugs. Cardiomyocyte function is controlled by an integrated system of ion channels which modulate the influx and efflux of potassium, calcium and sodium ions to modulate cellular contractility. Drug interference with these control mechanisms, e.g. via interaction with the HERG potassium channel, can lead to shortening or lengthening of cardiomyocyte action potentials and in some cases to early or late after-depolarisations which in-vivo may give rise to arrhythmia and heart failure.

Measurement of cardiomyocyte beat rate is a commonly used technique to assess drug cardiac liability. Cultured cardiomyocytes are imaged by video microscopy and video edge detection techniques are used to measure the rate at which the edge of a cell or cluster of cells moves into and out of a user determined detection zone (Gervais-Pingot et. al. 1994 Cell Biol Toxicol. 10(5-6):297-300; Dolnikov et. al. 2006 Stem Cells. 4(2):236-45.). This method requires dedicated equipment including specialised electronic hardware to perform video rate edge detection, for example VED motion edge detectors (www.crescent-electronics.com). Since the method relies on detection of movement of an object edge with high contrast the method is not suitable for all cultures, particularly those with high cell density where the imaged area is full of cells. Moreover since the technique requires an operator to establish the region of analysis for edge detection for each sample to be analysed the approach cannot be implemented in high throughput.

US 2008/0304732 describes methods for evaluation of cellular motion applied to cardiomyocyte cultures wherein time series images are acquired and motion vectors are derived for successive sequential pairs of images through the time series. These motion vectors are based on the displacement of each individual cell between consecutive image pairs and cellular motion is represented by a series of displacement vector diagrams indicating the presence and direction of movement between successive images. Cellular motion data are then extracted using optical flow algorithms and the resulting complex data reduced or decomposed using factorisation methods, such as principal component analysis, to allow motion data to be represented in low dimensional space, for example as a waveform plot. These methods require significant computer processing power and time to perform complex image and data analysis.

The present invention seeks to overcome the limitations of prior art methods by providing a system and a method of determining motion of a biological object using simple image subtraction techniques which are independent of cell density, image contrast or the presence of detectable edges. Furthermore, the present invention does not require complex data reduction or decomposition techniques, and may be implemented using automated high-throughput imaging equipment.

SUMMARY OF THE INVENTION

The method of the present invention provides a simple and readily automated means of quantifying motion of a biological object. The method is particularly suited for quantifying the motion of cellular cultures such as measuring the frequency of beating of cardiomyocytes.

According to a first aspect of the present invention, there is provided a system (100) for automated determination of the motion of a biological object, the system comprising:
  a) an imager (104) for acquiring a first time series of images of the object comprising successive frames ($f_1$ to $f_n$) and a reference frame ($f_R$);
  b) a processor (107) that is operable to
     i) generate a time series of subtractive images ($f_{R-1}$ to $f_{R-n}$);
     ii) derive one or more measurements from the time series of subtractive images; and
     iii) analyse said one or more measurements to quantify motion in the first time series of images;
  wherein generating the time series of subtractive images ($f_{R-1}$ to $f_{R-n}$) comprises subtracting each successive frame ($f_1$ to $f_n$) from said reference frame ($f_R$); or wherein
  generating the time series of subtractive images ($f_{R-1}$ to $f_{R-n}$) comprises subtracting the reference frame ($f_R$) from each successive frame ($f_1$ to $f_n$).

In one aspect, each frame comprises a plurality of pixels having an intensity value associated therewith and the processor is operable to generate the time series of subtractive images by means of the intensity values.

In another aspect, the one or more measurements is selected from the group consisting of mean pixel intensity, total pixel intensity and median pixel intensity.

In a further aspect, the object is a cultured organism or a cell culture.

Preferably, the cultured organism is selected from the group consisting of zebra fish or nematodes. Zebra fish (*Danio rerio* or *D. rerio*) or nematodes (*Caenorhabditis elegans* or *C. elegans*) are used in a variety of physiological, developmental, genetic, disease and toxicological studies.

Preferably, the cell culture is selected from the group consisting of bacterial cell culture, fungal cell culture, insect cell culture, fish cell culture and mammalian cell culture. More preferably, mammalian cell culture is a human cell culture. Most preferably, the human cell culture is a cardiomyocyte cell culture.

In a second aspect of the present invention, there is provided a method of determining the motion of a biological object comprising the steps of:
  i) acquiring a first time series of images of said object comprising successive frames ($f_1$ to $f_n$) and a reference frame ($f_R$);
  ii) generating a time series of subtractive images ($f_{R-1}$ to $f_{R-n}$);
  iii) deriving one or more measurements from said time series of subtractive images; and
  iv) analysing said one or more measurements to quantify motion in said first time series of images;
  wherein, generating the time series of subtractive images ($f_{R-1}$ to $f_{R-n}$) comprises subtracting each successive frame ($f_1$ to $f_n$) from said reference frame ($f_R$); or wherein generating the time series of subtractive images ($f_{R-1}$ to $f_{R-n}$) comprises subtracting the reference frame ($f_R$) from each successive frame ($f_1$ to $f_n$).

In one aspect, each frame comprises a plurality of pixels having an intensity value associated therewith and step ii) involves either subtracting said intensity value of each said frame from the corresponding intensity value of the reference frame ($f_R$) or subtracting the intensity value of the reference frame ($f_R$) from the corresponding intensity value of each frame.

In another aspect, the one or more measurements is selected from the group consisting of mean pixel intensity, total pixel intensity and median pixel intensity.

In a further aspect, the object is a cultured organism or a cell culture.

Preferably, the cultured organism is selected from the group consisting of zebra fish or *C. elegans*

Preferably, the cell culture is selected from the group consisting of bacterial cell culture, fungal cell culture, insect cell culture, fish cell culture and mammalian cell culture. More preferably, the mammalian cell culture is a human cell culture. Most preferably, the human cell culture is a cardiomyocyte cell culture.

In a further aspect, the method is an automated method.

According to a third aspect of the present invention, there is provided a use of the system or method as hereinbefore described in drug discovery and/or toxicological testing. The system and/or method can be used to evaluate the effect of a test agent, such as a physical stimulus or chemical agent, in the motion of a biological object. In particular, the system and/or method can be used to determine whether a test agent has a deleterious or toxic effect on the biological object. For example, the effect of the test agent can be determined on the motion of cardiomyocyte cell cultures by comparison with untreated control cultures, to ascertain if the test agent has an adverse effect on the rate of heart beat.

In a fourth aspect of the present invention, there is provided a computer program product comprising machine instructions operable to configure a data processing apparatus to implement the method as hereinbefore described.

It will be apparent to one skilled in the art that the method of the current invention for determining motion of a biological object may be applied to many diverse applications wherein motion is present. The motion may be fast, occurring over a timescale of seconds or fractions of a second, including but not limited to, cardiomyocyte contraction. Alternatively the motion may be relatively slow, occurring over minutes, hours or days. Examples of such motion include but are not limited to, movement of cells during cell migration, motility, chemotaxis or wound healing or movement or small organisms such as zebrafish and *C. elegans*. In all cases motion is measured by acquiring a time series of images, at an imaging frequency matched to the speed of motion under study, and motion is quantified using a process of image subtraction as described herein.

BRIEF DESCRIPTION OF THE DRAWINGS

In description of the method of the invention reference is made to the following figures.

DETAILED DESCRIPTION

Figure 1:
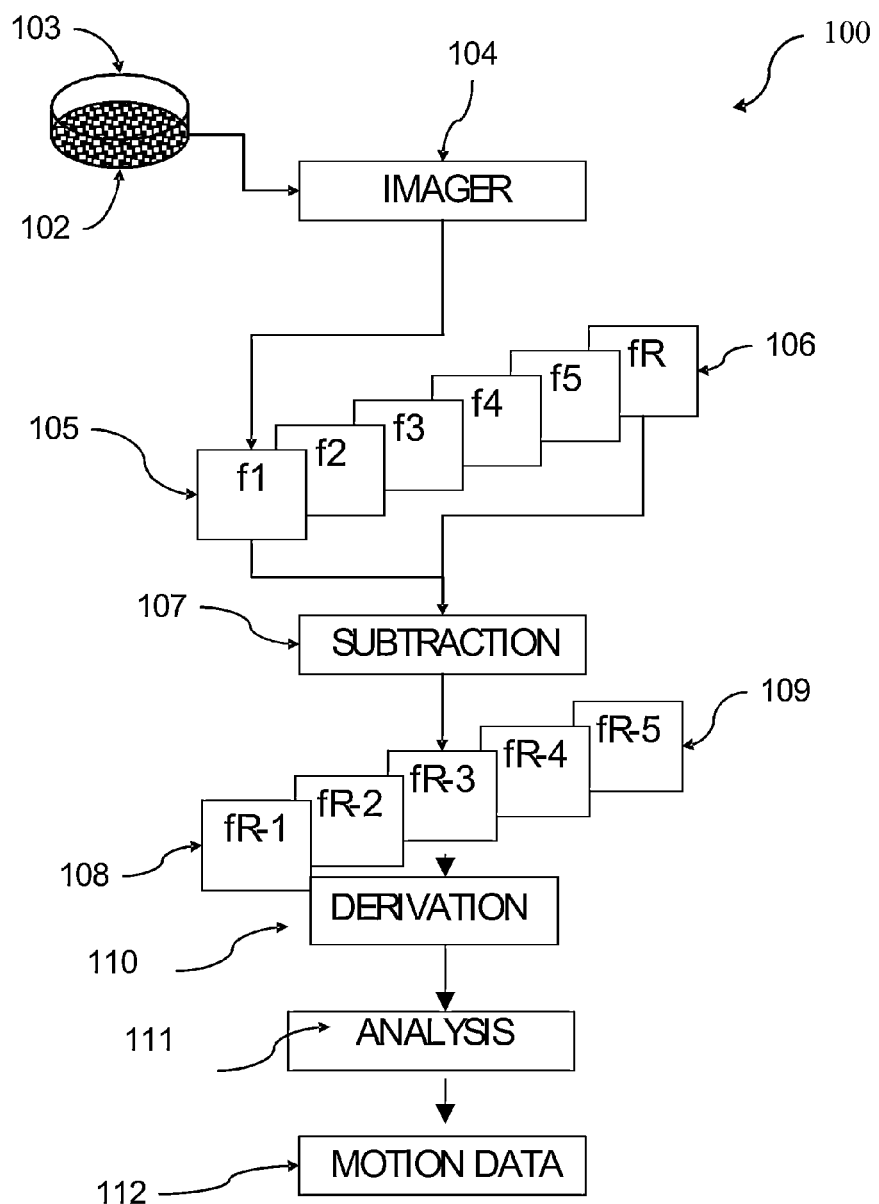
FIG. 1: Schematic diagram of principal features of the present invention.

The principal aspects of the present invention are shown in FIG. 1 illustrating a system [100] for automated determination of the motion of a biological object, the object being exemplified by a cell culture. Cells [102] cultured in one or more vessels [103] are imaged by an imager [104] to produce a time series of images starting with a first frame [105] and ending with a last frame [106] where the number of images and the time interval between images is chosen to be compatible with the motion to be analyzed. Generally the time interval between frames is selected such that the frequency of imaging is greater than the frequency or speed of the cellular motion under analysis. The time series of images [105-106] is processed using image subtraction [107] to produce a series of subtractive images starting with a first image [108] and ending with a final image [106] wherein each subtractive image results from subtraction of successive images in the time series from a reference image selected from the time series where the reference image may be the first image in the series [105] or alternatively may be the last image in the series [106]. This procedure produces a derivative series of subtractive images [108-109] where the maximum number of images is one less than the number of images in the time series [105-106]. One or more measurements are derived [110] from the time series of subtractive images and these measurements subjected to analysis [111] to quantify motion data [112].

Image subtraction is a readily implemented mathematical means to determine differences between two images. To perform image subtraction the pixel intensity values of equivalent pixels in the two images are subtracted and the resulting absolute (ABS) value (i.e. the difference in intensity values without a positive or negative sign) is recorded. For 8 bit grey-scale (256 grey levels) images where pixel intensity values may range from 0 (black) to 255 (white) the resulting pixel intensity values in subtractive images may range from 0 (no difference at that pixel between images) to 255 (white pixel in one image and black pixel in second image).

To form a subtractive image the pixel intensity values (P) of each equivalent pixel pair (i.e. pixels at the same x,y coordinates in each image), $P1xy$ and $P2xy$ are subtracted and the resulting values used to create a third derivative subtractive image by applying the resultant pixel pair intensity difference value to a pixel ($\Delta Pxy$) at an equivalent position (i.e. same x,y coordinates) to generate a third image;

$$\Delta Pxy = ABS(P1xy - P2xy)$$

Alternatively other difference measures may be applied to equivalent pixel pairs, for example;

$$\Delta Pxy = \sqrt{(P1xy - P2xy)^2}$$

Figure 2:
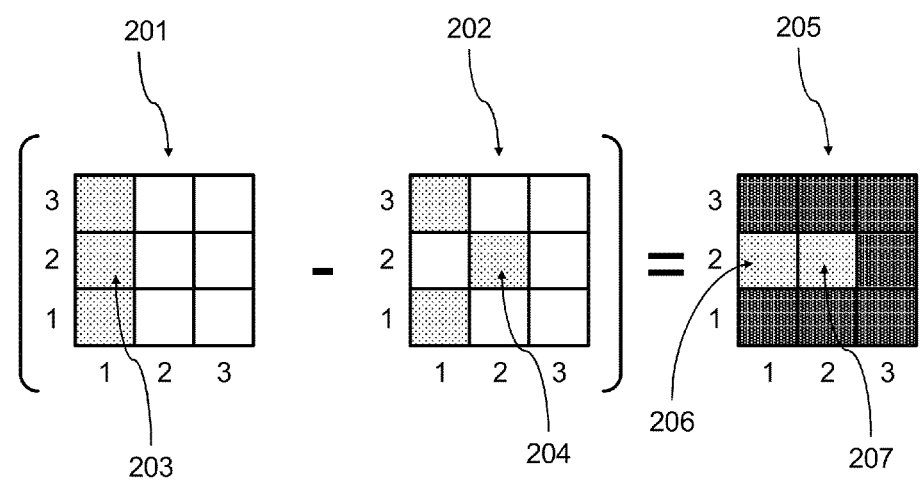
FIG. 2: Principle of pixel by pixel image subtraction.

Pixel by pixel image subtraction is illustrated schematically in FIG. 2. A digital image [201] comprises a 3×3 array of pixels with (x,y) coordinates in the range 1-3 has a column of 3 mid-grey pixels [203]. A second digital image [202] is identical to image [201] except that pixel (1,2) has been replaced by a white pixel and pixel (2,2) has been replaced by a mid-grey pixel [204]. In a time series of images the single pixel difference between image [201] and [202] may represent movement of an imaged object between the times of acquisition of the two images. Subtraction of image [202] from image [201] yields a third subtractive image [205] which contains information on the differences between images [201] and [202]. Pixels which are unchanged between the subtracted images, i.e. those pixels which are white or mid-grey in both images [201] and [202] produce black pixels in the subtractive image [205] since subtraction of equal pixel values results in a subtractive image pixel value of 0. Pixels which differ between images [201] and [202] produce pixel values in the subtractive image [205] which have values equal to the absolute value of the differences in pixel values. Consequently both pixels (1,2) [206] and (2,2) [207] in the subtractive image have mid-grey values representing the two pixels which differ between image [201] and [202]. Analysis of pixel values in the subtractive image [205] can therefore be used to provide a quantitative measure of differences between the two images [201] and [202].

Figure 3:
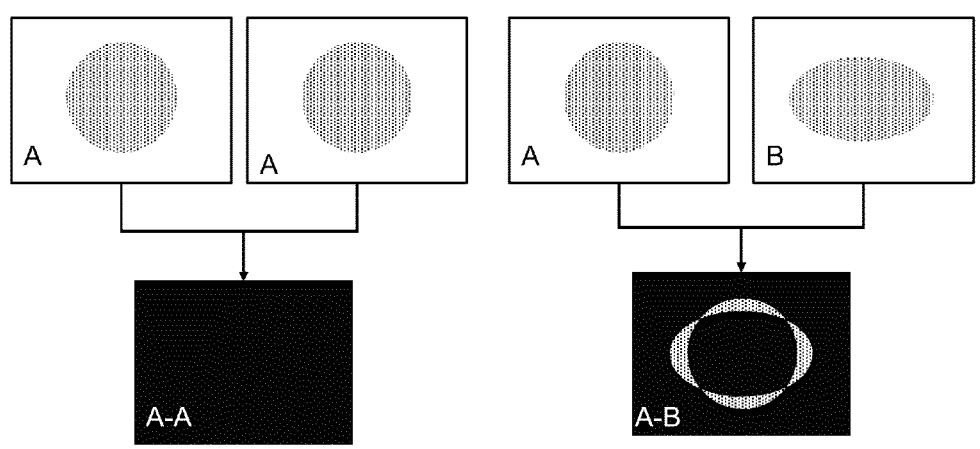
FIG. 3: Principle of image subtraction of equivalent and non-equivalent images.

The image subtraction process is illustrated schematically for whole model images in FIG. 3 where subtraction of two identical images, [A] and [A], produces a subtractive image [A-A] where all pixel values are zero, yielding a pure black image. Subtraction of two non-identical images [A] and [B] results in a subtractive image [A-B] with a mix of black and mid-grey pixels. In the subtractive image [A-B] black pixels indicate areas where images [A] and [B] are identical, i.e. equivalent pixels are both white (255-255=0) or are both mid-grey (128-128=0). Mid grey areas in the subtractive image [A-B] indicate areas where images [A] and [B] differ, i.e. pixels which are white in one image and mid-grey in the other image since ABS(128-255)=127 or ABS(255-128) =127. Consequently if images [A] and [B] are taken from a time series of images the subtractive image [A-B] may be used to analyze motion and/or transformation, e.g. the deforming of the circle in image [A] to an ellipse in image [B].

In any time series of images, provided that the imaged subject or specimen does not move relative to the camera or other image capture device during imaging and further provided that illumination intensity remains constant, any difference between sequentially recorded images is due to motion within the subject area and the time series of images may be used to analyse motion within the subject using image subtraction by the method of the present invention.

Figure 4:
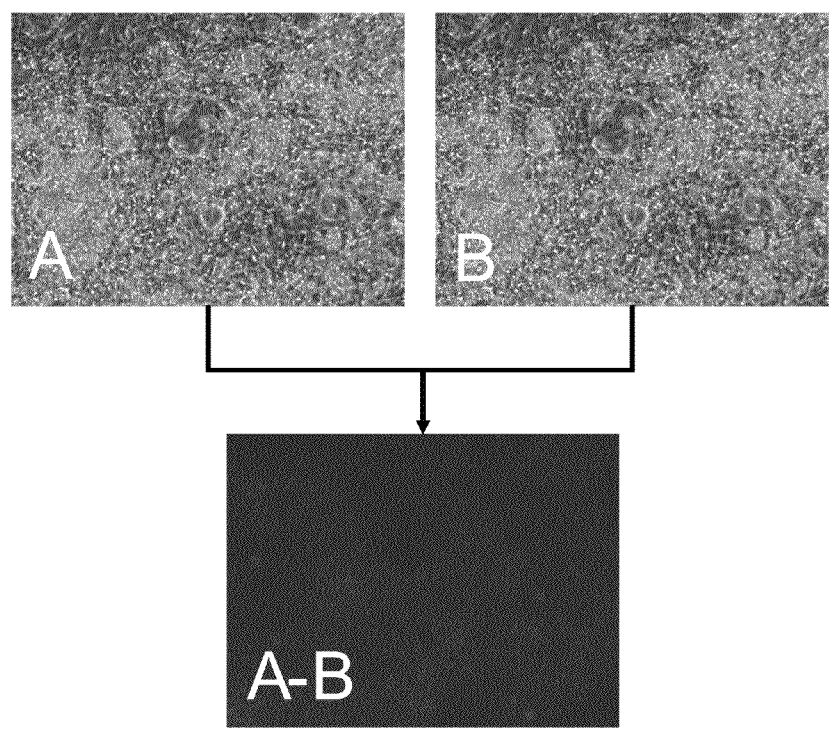
FIG. 4: Image subtraction of video frame images of beating cardiomyocytes.

This process is illustrated in FIG. 4 using two frames from a video-microscopy sequence of spontaneously beating cardiomyocytes derived by differentiation of human embryonic stem cells. Subtraction of two images from the time series [A] and [B] yields a subtractive image [A-B] where the majority of the pixels have low values (black and dark grey) indicating minimal differences between the two images at these points. In other areas pixels have higher values indicating differences between [A] and [B]. Since during the acquisition of the video neither the cardiomyocyte culture nor the video camera were moved, differences between frames [A] and [B] which result in pixel values>0 in the subtractive image [A-B] are due to motion within the imaged area, i.e. motion due to cardiomyocyte beating.

Figure 5:
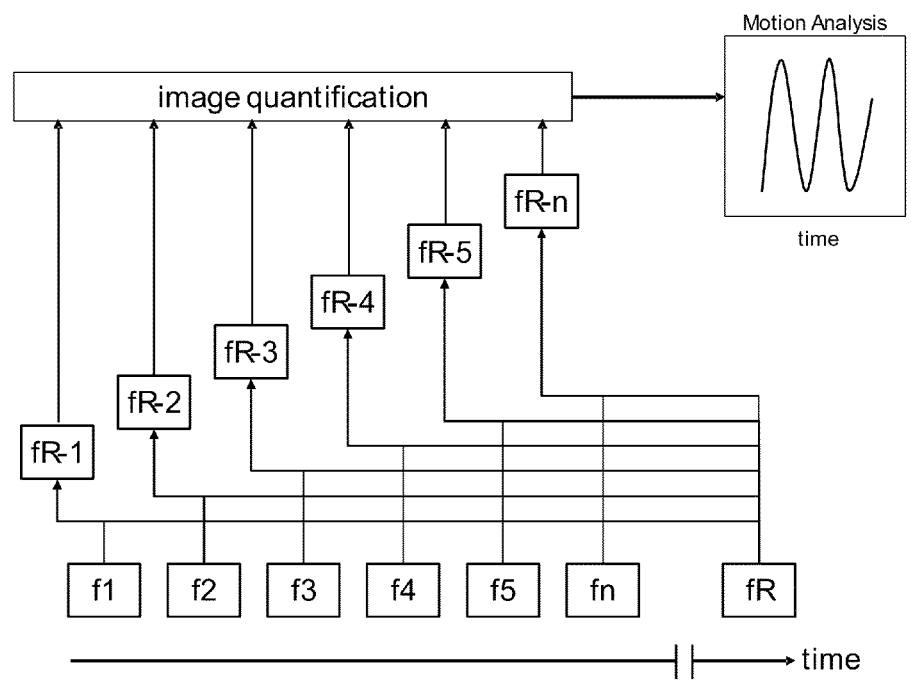
FIG. 5: Schematic for image subtraction procedure to determine motion in time series images.

The process of image subtraction may be extended to allow the analysis of a number of images in a time series, for example analysis of multiple frames through a video sequence. For analysis of multiple frames in a time series of images (FIG. 5) individual frames [f1] to [fn] are subtracted from a reference frame [fR] to produce corresponding subtractive images [fR-1] to [fR-n]. The reference frame [fR] may be selected from any point in the time series outside of the series [f1] to [fn], i.e. [fR] may be selected to be a frame preceding [f1] or subsequent to [fn], to ensure that the resulting data abstracted from the series of subtractive images [fR-1] to [fR-n] is contiguous. The process of producing subtractive images can be readily implemented using standard image processing software operations in a semi-automated or fully automated process.

The series of subtractive images is then used to derive one or more measures which may be used to quantify image differences for graphical display and further analysis of motion within the imaging time series. Suitable measures include, but are not limited to, mean pixel intensity, total pixel intensity and median pixel intensity. Plotting of the resulting data as a time series, e.g. mean pixel intensity against image acquisition time, generates a graphical depiction of the motion within the cell culture over time. In the case of a culture exhibiting constant contraction and relaxation motion, such as exhibited by spontaneously beating cardiomyocyte cultures, the resulting graphical depiction of motion in the time domain will take the form of a repeating wave.

To establish the frequency of detected motion, e.g. the beat rate of a cardiomyocyte culture, data may be transformed from the time domain to the frequency domain using standard Fourier Analysis procedures (Fast Fourier Transforms, Walker, J. S. CRC Press. 1996). Alternatively correlation analysis may be performed on the time series data to establish the repeat frequency.

Example 1

Cardiomyocyes were obtained by differentiation of the H7 human embryonic stem cell (hESC) line as described in U.S. Pat. No. 7,452,718. Undifferentiated H7 hESC cells were seeded into 24 well matrigel coated plates. After one week of growth as undifferentiated cells, the medium was changed to RPMI+B27 supplement, with 50 ng/mL Activin A and 50 ng/mL BMP-4. After four days, the growth factors were removed by medium exchange, and the cells were then cultured for an additional 14 days in RPMI+B27 alone resulting in cells expressing Nkx2.5, α-actinin and other markers of cardiac cells and which showed spontaneous beating.

A video file of spontaneously beating cardiomyocytes derived from hESC acquired at 10 frames/second was imported into Adobe ImageReady and a representative series of 114 video frames abstracted from the .wmv video file and exported to Abobe Photoshop. The resulting file contained 114 layers each comprising a single frame from the original video in ascending time series order. Subtraction of pairs of images was achieved by designating frame 114 as a reference frame and setting the Photoshop layer blend mode to Difference for this layer. By sequentially selecting each frame layer from 1-113 in turn a series of subtractive images were obtained.

Figure 6:
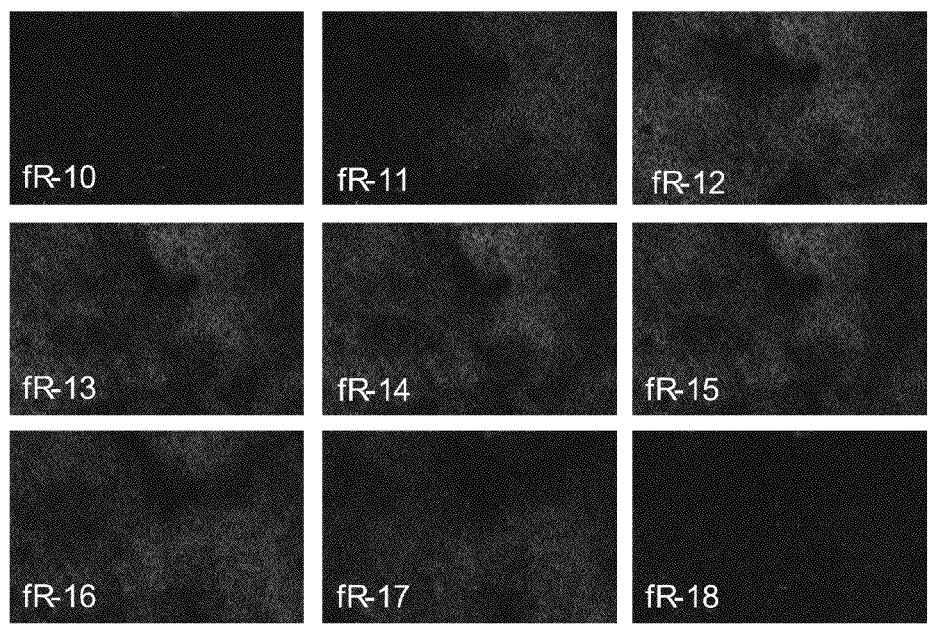
FIG. 6: Subtractive images resulting from a time series of video frames of beating cardiomyocytes produced by subtraction of a series of video frame images from a reference video frame image.

Examples of subtractive images are shown in FIG. 6 for subtraction of image 10 from the reference frame [fR-10] through to subtraction of frame 18 from the reference frame [fR-18]. Visual inspection of the subtractive images [fR-10] to [fR-18] showed a temporal variation in image pixel intensity from predominantly black in [fR-10] through images with increasing and then decreasing pixel intensities from [fR-11] to [fR-17] with the final image in the series [fR-18] having predominantly low pixel intensity values. These variations in pixel intensity in the subtractive images indicate a cyclical variation in image difference between the image frames and the reference frame.

Figure 7:
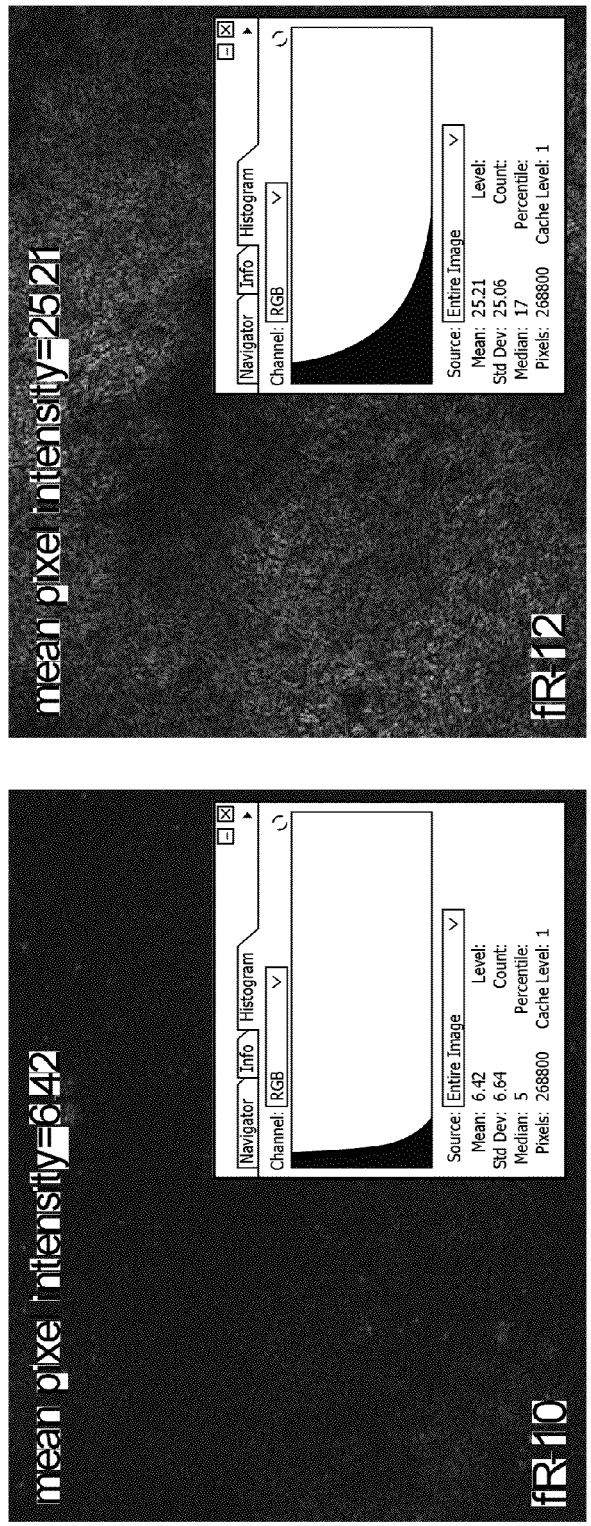
FIG. 7: Quantification of pixel intensity values in subtractive images from a time series of video frames of beating cardiomyocytes.
Figure 8:
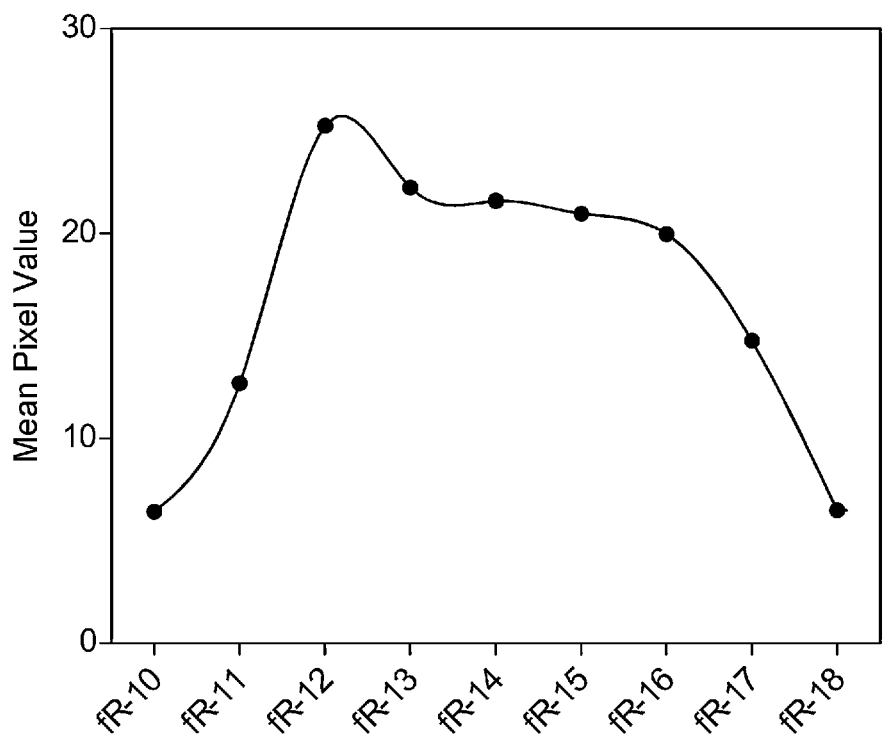
FIG. 8: Mean pixel values for subtractive images derived from a time series of video frames of beating cardiomyocytes.

Examination of pixel intensity values (FIG. 7) using the Photoshop histogram display function showed that the variance in pixel intensity observed by visual inspection correlated with quantitative changes in pixel intensity with subtractive image [fR-10] having a mean pixel intensity value of 6.42 and subtractive image [fR-12] having a mean pixel intensity value of 25.21. Plotting mean pixel intensity values for the series of subtractive images (FIG. 8) confirmed the observed cyclical pattern of image difference between respective frames and the reference frame indicating that the method was detecting motion in the video times series images.

Figure 9:
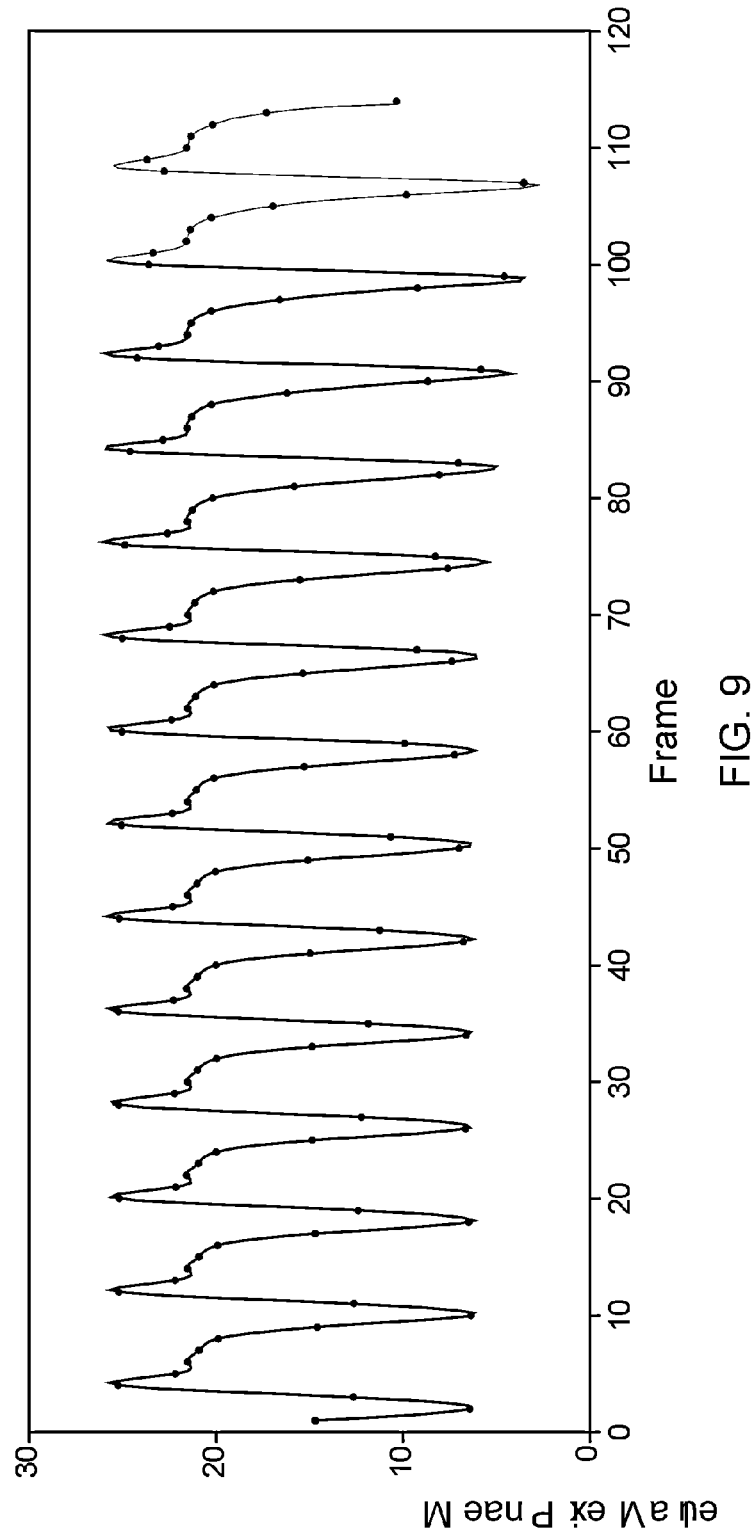
FIG. 9: Mean pixel values for an extended series of subtractive images derived from a time series of video frames of beating cardiomyocytes.
Figure 10:
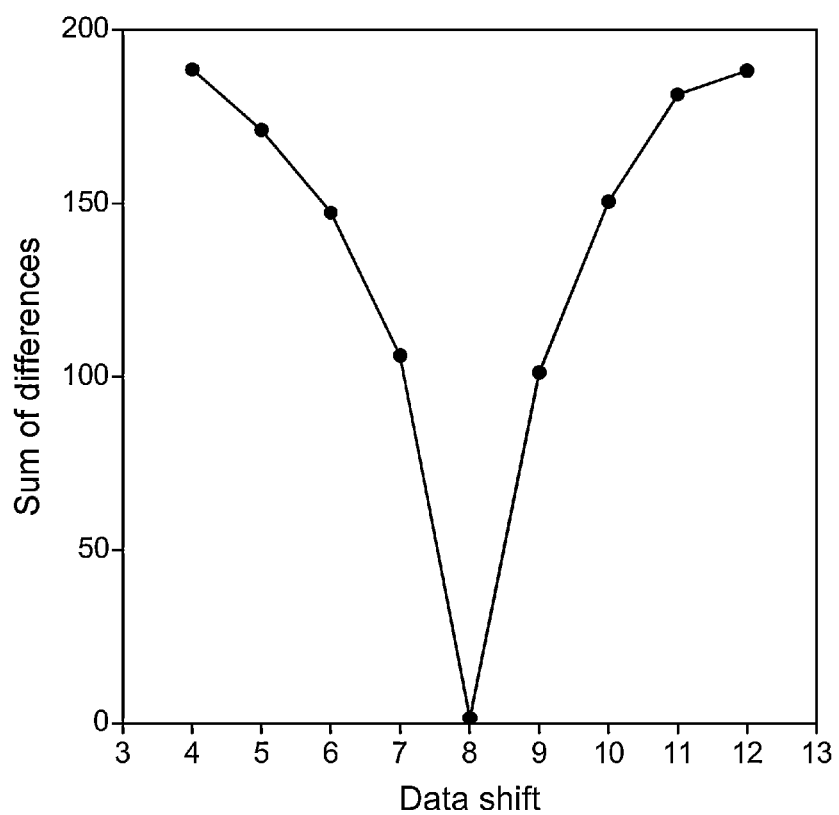
FIG. 10: Correlation analysis of mean pixel values derived from an extended series of subtractive images derived from a time series of video frames of beating cardiomyocytes.

To measure cardiomyocyte beating frequency in the video images mean pixel intensities for 113 subtractive images were plotted against their corresponding frame number (FIG. 9). The results indicate continuous spontaneous beating with minor variations in amplitude over the duration of the video sequence with a frequency of 1 beat cycle every 8 frames. Cardiomyocyte beat frequency was confirmed mathematically using correlation analysis (FIG. 10) by calculating the sum of absolute differences between the series of mean pixel intensity values over 113 frames (FIG. 8) and the same data series shifted in one frame increments. A minimum difference was obtained with an 8 frame shift in the data (FIG. 10) consistent with an 8 frame cycle in the motion detected by image subtraction. This was confirmed using linear regression analysis of a staggered scatterplot of time series data using an 8 place shift between x and y data, yielding a correlation of $r^2=0.99$ and slope=0.99. At the 10 frames/second used for video imaging this equates to a beat rate of 1.25 beats/second or 75 beats/minute, a typical value for spontaneously beating human cardiomyocytes.

Example 2

Figure 11:
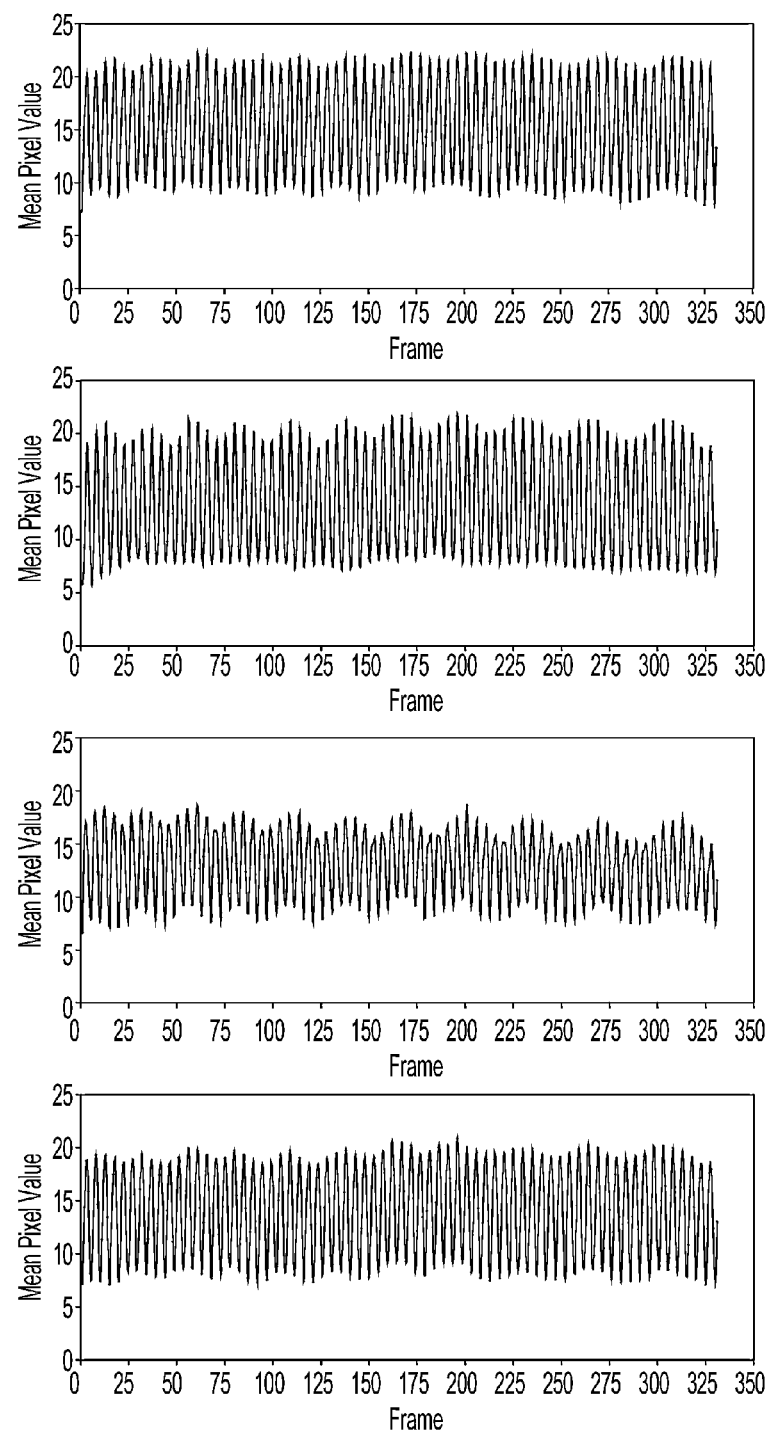
FIG. 11: Mean pixel values for an extended series of subtractive images derived from a time series of video frames of beating cardiomyocytes.
Figure 12:
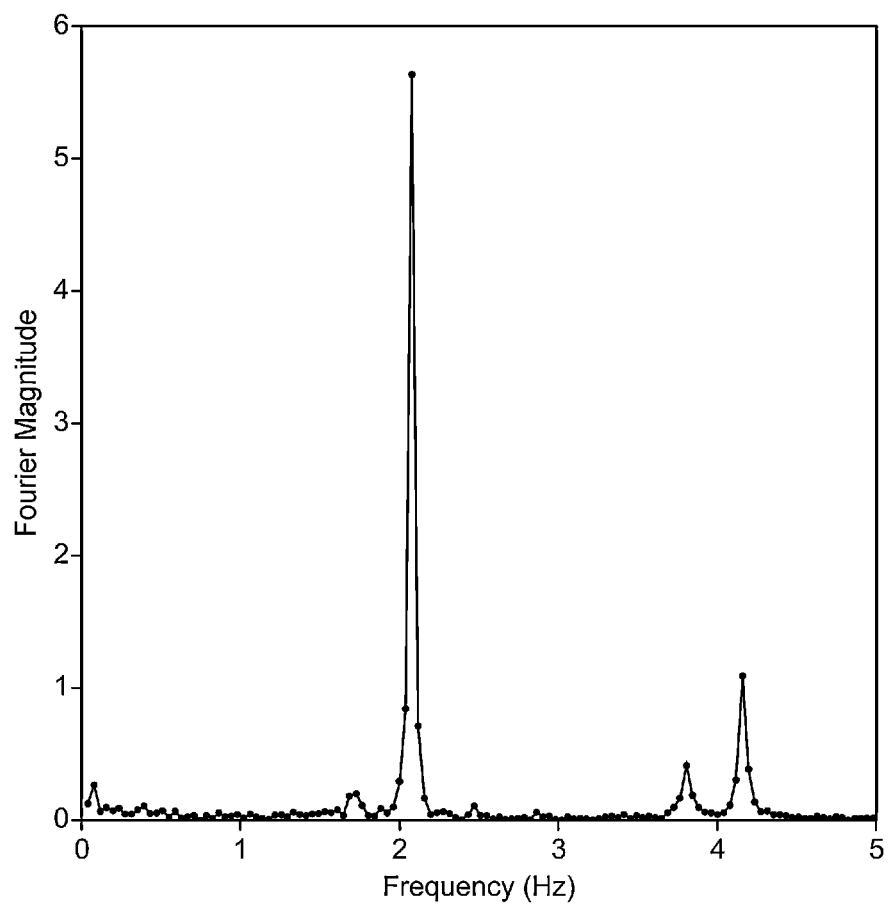
FIG. 12: Fourier frequency analysis of data from an extended series of subtractive images derived from a time series of video frames of beating cardiomyocytes.

Image frames from a second video file of spontaneously beating cardiomyocytes derived from human embryonic stem cells acquired at 10 frames/second were imported into Image J (http://rsbweb.nih.gov/ij/) to give 332 time series images for analysis. Four rectangular sub-regions were defined within the imaged field and each sub-region in each of 331 time series images was processed independently using the equivalent sub-region in frame 332 as a reference for image subtraction. To measure cardiomyocyte beating frequency in the different regions mean pixel intensities for 331 subtractive images for each of the four regions were plotted against their corresponding frame number (FIG. 11). Fourier analysis performed in Microsoft Excel (FIG. 12) of data from one of the regions showed a principal frequency of 2.07 Hz for cardiomyocyte beating, equivalent to 124 beats/minute.

Whilst the present invention has been described in connection with various embodiments, those skilled in the art will be aware that many different embodiments and variations are possible. All such variations and embodiments are intended to fall within the scope of the present invention as defined by the appended claims.

The invention claimed is:

1. A system for automated determination of the cyclic cellular motion of a cardiomyocyte cell culture, the system comprising:
   a) an imager for acquiring a first time series of images of the cardiomyocyte cell culture, wherein the first time series of images comprises successive frames ($f_1$ to $f_n$) and a reference frame ($f_R$), and wherein the time interval between successive frames is selected such that the frequency of imaging is greater than the frequency of the cyclic cellular motion;
   b) a processor that is operable to
      i) generate a time series of subtractive images ($f_{R-1}$ to $f_{R-n}$);
      ii) derive one or more measurements from the time series of subtractive images; and
      iii) analyse the one or more measurements to quantify the cyclic cellular motion in the first time series of images; and
   wherein generating the time series of subtractive images ($f_{R-1}$ to $f_{R-n}$) comprises subtracting each successive frame ($f_1$ to $f_n$) from the reference frame ($f_R$) or subtracting the reference frame ($f_R$) from each successive frame ($f_1$ to $f_n$).

2. The system of claim 1, wherein each frame comprises a plurality of pixels having an intensity value associated therewith, and wherein the processor is operable to generate the time series of subtractive images based on the intensity values.

3. The system of claim 1, wherein the one or more measurements is selected from the group consisting of mean pixel intensity, total pixel intensity and median pixel intensity.

4. A method of determining the cyclic cellular motion of a cardiomyocyte cell culture comprising the steps of:
   i) acquiring a first time series of images of the cardiomyocyte cell culture, wherein the first time series of images comprises successive frames ($f_1$ to $f_n$) and a reference frame ($f_R$), and wherein the time interval between successive frames is selected such that the frequency of imaging is greater than the frequency of the cyclic cellular motion;

ii) generating a time series of subtractive images ($f_{R-1}$ to $f_{R-n}$);
iii) deriving one or more measurements from the time series of subtractive images; and
iv) analysing the one or more measurements to quantify the cyclic cellular motion in the first time series of images; wherein generating the time series of subtractive images ($f_{R-1}$ to $f_{R-n}$) comprises subtracting each successive frame ($f_1$ to $f_n$) from the reference frame ($f_R$) or subtracting the reference frame ($f_R$) from each successive frame ($f_1$ to $f_n$).

5. The method of claim 4, wherein each frame comprises a plurality of pixels having an intensity value associated therewith, and wherein generating the time series of subtractive images ($f_{R-1}$ to $f_{R-n}$) comprises either subtracting the intensity value of each successive frame ($f_1$ to $f_n$) from the corresponding intensity value of the reference frame ($f_R$) or subtracting the intensity value of the reference frame ($f_R$) from the corresponding intensity value of each successive frame ($f_1$ to $f_n$).

6. The method of claim 4, wherein the one or more measurements is selected from the group consisting of mean pixel intensity, total pixel intensity and median pixel intensity.

7. The method of claim 4, wherein the method is an automated method.

8. A non-transitory computer readable medium storing a program causing a computer to determine the cyclic cellular motion of a cardiomyocyte cell culture, the program causing a data processing apparatus to execute the method of claim 4.

* * * * *